March 25, 1969     H. BENJAMIN     3,434,859
METHOD FOR DEPOSITING A COATING ON THE INTERNAL
WALLS OF CAPILLARY OR SMALLBORE TUBES
Filed Dec. 29, 1964

3,434,859
METHOD FOR DEPOSITING A COATING ON THE INTERNAL WALLS OF CAPILLARY OR SMALL-BORE TUBES
Harry Benjamin, Daventry, England, assignor to Harshaw Chemicals Limited, Daventry, England
Filed Dec. 29, 1964, Ser. No. 421,986
Claims priority, application Great Britain, Jan. 7, 1964, 716/64
Int. Cl. B44d 1/094
U.S. Cl. 117—17     10 Claims

ABSTRACT OF THE DISCLOSURE

This invention relates to a method of and apparatus for internally coating a capillary tube with powdered material, said tube having poor electrical conductivity, comprising the steps of supplying a charge of the powdered material to one end of tube, positioning the tube at an angle relative to the horizontal with said one end uppermost so that particles of the powdered material flow into the tube, and subjecting the tube to rapid vibrational movement so as to cause rubbing contact between said particles and the internal wall of the tube, whereby said rubbing contact induces an electrostatic charge in the tube and the particles adhere to the internal wall of the tube by electrostatic attraction.

---

In the testing or chemical analysis of liquids, it is frequently necessary to treat the liquid with a solid chemical reagent in powdered form which alters the physical and/or chemical properties of the liquid, such as for example the colour of the liquid or separation of the liquid into two constituents of different colour. Previously, the liquid was poured into a test tube or other glass vessel containing a quantity of the reagent, the mouth of the tube was sealed by a stopper, and the tube was shaken by hand to thoroughly mix the reagent with the liquid. Several cubic centimeters of liquid were required for each test, and in the case of pathological testing of blood, the blood had to be extracted from the patient through an intravenous puncture.

The object of the invention is to provide a capillary or small-bore tube provided with a coating of a reagent in powdered form on the internal wall of the tube. Liquid to be tested with the reagent may then be drawn by capillary attraction into the bore of the tube and thereby into contact with the reagent, so that only a small quantity of liquid would be required for each test.

According to the invention there is provided a method of internally coating a capillary or small-bore tube with powdered material, comprising the steps of passing the powdered material in a substantially dry condition through the capillary tube while subjecting the capillary tube to vibrational movement or intermittent movements in rapid succession, whereby an electrostatic charge is induced in the tube and particles of the powdered material adhere to the inside wall of the tube by electrostatic attraction.

It is believed that the frictional rubbing contact between the powdered material and the tube, due to the vibrational or intermittent movement of the tube, induces the electrostatic charge in the tube. Preferably an electrostatic charge additional to that induced in the tube by its vibrational or intermittent movement, is induced in the tube while it is subjected to such movement. An electrostatic charge may however be induced in the tube prior to passing the powder through the tube.

The powdered material may be passed through the capillary tube successively in opposite directions until a uniform coating of the powdered material is formed on the internal wall of the capillary tube throughout its length. The individual particles of the powdered material may be of a size such that the particles will pass through a 180 mesh screen, that is a screen having 180 openings per square inch, but are retained on a 200 mesh screen.

The capillary tube is preferably made of transparent material, so that when liquid to be tested is drawn into the tube by capillary attraction, any changes in the physical properties of the liquid due to reaction with the powdered material on the internal wall of the tube can be observed through the wall of the tube.

The capillary tube is also preferably made of transparent material of poor electrical conductivity, for example glass, so that no special precautions need be taken to retain the electrostatic charge in the coated tube and thereby hold the powdered material in contact with the inside wall of the tube during storage.

Most powdered materials however absorb moisture when exposed to the atmosphere, and this causes the individual particles of the coating to adhere to the inside wall of the capillary tube should the electrostatic charge be dissipated after a period of time.

A plurality of capillary tubes are preferably coated simultaneously with the powdered material, by placing a charge of the powdered material in a portion of a tubular container, loosely packing the capillary tubes into an adjacent portion of the container with the axes of the capillary tubes substantially parallel to the axis of the tubular container, positioning the container at an angle to the horizontal with the powder above the capillary tubes, and subjecting the container and tubes to vibrational movement or intermittent movements in rapid succession, whereby an electrostatic charge is induced in the tubes and part of the powdered material passes through the interior of the tubes and adheres to the internal walls thereof by electrostatic attraction. The tubular container is preferably rotated about its longitudinal axis while it is subjected to the vibrational or intermittent movement.

An electrostatic charge, additional to that induced by the vibrational or intermittent movement of the container and tubes, may be induced in the container and capillary tubes by rubbing animal fur against the container, and a band of the fur can conveniently be mounted around the periphery of a power driven pulley, the band of fur being lapped or knotted to form an enlargement arranged to strike the container once in each revolution of the pulley and thereby impart an impact blow to the container and cause the container to move about its longitudinal axis.

According to the invention there is also provided apparatus for providing a coating of powdered material on the internal walls of capillary or small-bore tubes, the apparatus comprising a tubular container for reception of the capillary tubes and powdered material, and means for subjecting the container to a vibrational or intermittent movement, wherein the container comprises two hollow cylinders each closed at one end thereof and a tubular coupling member screwed at its ends on the open ends of the two cylinders, the coupling member having a screen which subdivides the interior of the container into two compartments, each compartment being adapted to hold a plurality of capillary tubes and a charge of powdered material.

In the testing of liquid with a capillary tube coated with a reagent in powdered form, only a small quantity of the liquid is required to fill a section of the tube and, due to the small diameter of the tube which may be only 1 millimeter, all the liquid in the capillary tube is brought into close promixity to the reagent so that a very quick and thorough reaction takes place between the reagent and the liquid.

Moreover, since the area of the inside wall of a tube is proportional to the diameter of the tube while the volume of the tube is proportional to the square of the diameter, the quantity of the reagent to be brought into contact with a unit volume of the liquid can conveniently be varied by a suitable selection of the diameter of the tube for a given thickness of the coating of the reagent.

One construction of apparatus for forming a coating of a powdered substance on the inside walls of glass capillary tubes by the method of the invention, will now be described by way of example with reference to the accompanying drawings, in which.

Figure 1:
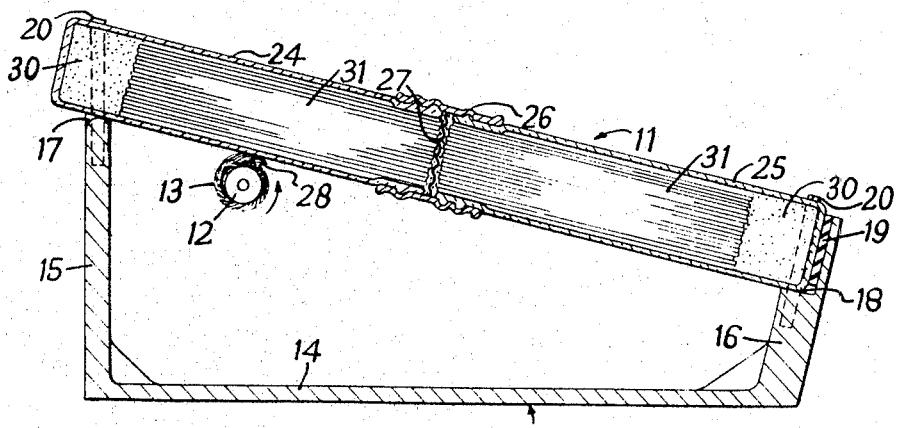
FIGURE 1 is a sectional side elevation view of the apparatus.
Figure 2:
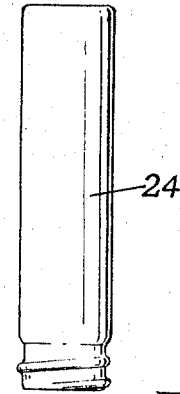
FIGURE 2 is an end elevational view of the apparatus.
Figure 3:
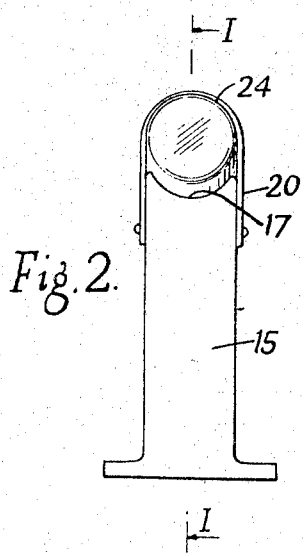
FIGURE 3 is an exploded view of the individual parts of a tubular container of the apparatus of FIGURES 1 and 2.

The apparatus shown in the drawings, comprises a stand 10, a tubular container 11 mounted on the stand at an angle to the horizontal, and a power driven pulley 12 provided with a band of fur 13 on its periphery.

The stand 10 is made of wood and comprises a base 14 and two end walls 15, 16. The end wall 15 is vertical and provided at the top thereof with a part-circular seat 17 for one end of the container. The end wall 16 is inclined outwardly away from the wall 15 and the upper end of the inside surface of the wall 16 is provided with a recess forming a seat 18 for the other end of the tubular container, the seat 18 being at a level below that of the seat 17 so that the container, when mounted on the seats, is inclined at an angle to the horizontal. The base of the recess in the wall 16 is provided with a rubber pad 19 which engages the adjacent end of the container, and the container is held loosely on the seats 17, 18 by elastic bands 20 which extend over the container and are secured at their ends to opposite sides of the end walls 15, 16.

The container 11 comprises two hollow glass cylinders 24, 25 which are sealed at one end and provided with a screw thread at the open end thereof, and a screw threaded tubular coupling member 26 is screwed at its end over the open end of the two glass cylinders. A metal screen 27 extends across the centre portion of the coupling member 26, the openings in the screen being large enough to allow powder to pass freely but small enough to retain capillary tubes within the glass cylinders 24, 25.

The driving pulley 12 is positioned below the upper end portion of the container 11, and is arranged so that upon rotation of the pulley the band of fur rubs against the container. The ends of the fur are lapped or knotted so as to provide an enlargement 28 which imparts an impact blow to the container once in each revolution of the pulley. The rotational axis of the pulley is inclined at a small angle to the radial plane of the container which passes through the point of contact between the band of fur and the container, so that the movement of the band of fur imparts rotational movement to the container about its longitudinal axis, the elastic bands 20 being slack enough to permit such rotational movement of the container.

A substance to be coated on glass capillary tubes by the apparatus described above, is first ground to a fine powder, preferably having a particle size small enough to pass through a 180 mesh screen but large enough to be retained on a 200 mesh screen, and a charge 30 of the powder in a dry condition is fed into each of the glass cylinders 24, 25, the two glass cylinders having previously been disconnected from the coupling member 26.

Each of the glass cylinders 24, 25 is then loosely packed with straight capillary tubes 31 arranged parallel to the axes of the glass cylinders. The capillary tubes, which are preferably made of glass, are of a length such that they extend along almost the whole length of the portion of the glass cylinder not occupied by the charge of powder, but do not project beyond the open end of the glass cylinder. The glass cylinders can conveniently be about 13 centimeters long, and the capillary tubes about 10 centimeters long with an internal diameter of about 1.0 millimeter and an external diameter of about 1.4 millimeters.

The glass cylinders containing the charge of powder and the capillary tubes are then screwed into the coupling member, and the assembled container consisting of the glass cylinder and the coupling member is then placed in position on the stand. The container is thus at an angle to the horizontal and has a charge 30 of powder in its upper end portion, two sets of capillary tubes 31 separated by the metal screen 22, and a charge 30 of powder in its lower end portion, as shown in FIGURE 1.

In operation, the pulley 12 is rotated at a relatively high speed and the enlargement 28 in the band of fur causes the container to vibrate on the stand and to turn slowly about its axis. This vibration causes the powder in the upper end of the glass cylinder 24 of the container to flow downwards through the bores in the capillary tubes in the cylinder 24, and causes the particles of powder to rub against the capillary tubes and the container. This rubbing contact between the particles of powder and the tubes and container induces a small electrostatic charge in the tubes so that the particles of powder which contact the bare inside walls of the capillary tubes adhere to the inside walls. A further electrostatic charge is induced in the container and capillary tubes by the rubbing contact between the fur and the container, and this additional charge assists in causing the particles to adhere to the inside walls of the capillary tubes. Some of the particles, of course, pass between the capillary tubes and may adhere to the outside walls of the capillary tubes or to the inside wall of the cylinder 24.

The particles which are not deposited on the walls of the capillary tubes in the cylinder 24 or on the wall of the cylinder pass through the openings in the metal screen 27 and into the cylinder 25 of the container, and these particles then flow downwards through and between the capillary tubes in the cylinder 25, the particles which contact the inside walls of the capillary tubes adhering to these walls due to the electrostatic charge.

The container 11 is then reversed on the stand so that the cylinder 25 rests on the seat 17 and the cylinder 24 rests on the seat 18, and the container again vibrated by rotation of the band of fur. The powder in the cylinder 25 then passes downwards through and between the capillary tubes in the cylinders 25 and 24. This operation is preferably repeated until the particles of powder not already adhering to the capillary tubes have passed several times through and between the capillary tubes.

When the capillary tubes are removed from the cylinders 24, 25 of the container, it is found that the inside wall of each capillary tube has a uniform coating of powder throughout its length, and this coating remains in position during subsequent handling, transport and storage over a long period. Any coating on the outside wall can, if desired, be removed by wiping the tube with a cloth.

It is essential that the powder be in a dry condition, since otherwise individual particles adhere to one another and cause a blockage inside the capillary tubes, and that the container 11 be formed either of an insulating material such as glass or is insulated from earth so that the container can retain the electrostatic charge.

Although the container is preferably rubbed with animal fur or otherwise provided with an additional electrostatic charge, satisfactory results can be obtained by mounting the container, filled with the capillary tubes and the powder, on a vibrating table with the axis of the container inclined to the horizontal. The electrostatic charge is then induced solely by the frictional rubbing contact between the powder and the tubes and container. However, an additional electrostatic charge is preferably induced in the container and tubes, since it is believed that the additional electrostatic charge results in a more even coating of powder on the inside walls of the capillary tubes and that the tubes hold the charge for a longer period during handling and storage.

A coated capillary tube according to the invention is particularly suitable for use in a sedimentation rate test of blood. Such tests are generally carried out by dissolving dipotassium sequestrine in the blood and then measuring the sedimentation of the blood cells in the plasma over a given period of time. Dipotassium sequestrine is however very soluble in blood, and in a capillary tube coated with this substance, the blood may flush away the coating at the lower end of the tube during its passage up the tube. Sequestrine is a proprietary trade name for the di-sodium and/or di-potassium salts of di-amino ethane tetra-acetic acid.

For this reason capillary tubes for use in sedimentation rate tests of blood are preferably provided with an internal coating consisting of 90% disodium sequestrine and 10% dipotassium sequestrine. Disodium sequestrine is less soluble in blood than dipotassium sequestrine and thereby prevents the coating at the lower end of the tube being flushed away. Such a coating is obtained by passing a dry powder of this composition through capillary tubes packed in an electrostatically charged container as described above.

In a sedimentation rate test of blood with a capillary tube coated with 90% disodium sequestrine and 10% dipotassium sequestrine, the blood is obtained from a suitable area of the body, such as the lobe of an ear, the ball of a finger, or the side of a thumb. The chosen area is cleaned and sterilized, for example by rubbing with a swab immersed in Hibitane, and is then pricked with a pre-sterilized lancet. Hibitane is a proprietary trade name for chlorhexidine digluconate. The first drop of blood is preferably wiped off with a dry swab, and slight pressure exerted on the pricked area to express a further drop of blood. Care should be taken not to exert undue pressure on the pricked area as this may cause an excess of lymph to dilute the blood and a concentration of cells and haemoglobin to occur. The capillary tube is filled by placing the lower end in the blood drop with the tube arranged at a small angle to the horizontal, so that the blood is drawn into the tube by capillary attraction. The upper end of the tube is then sealed by the forefinger, and the tube placed against a scale with the lower end of the tube embedded in plasticine which seals off the lower end. The sequestrine coating on the tube dissolves in the blood, and the sedimentation of the blood cells after a given period of time can be measured against the scale.

The capillary tube is preferably provided with a zone intermediate its ends which is more readily breakable than at parts of the tube adjacent the zone, whereby the tube may be readily broken at the zone. For example, a glass tube may have a thin band made of a glass having a different co-efficient of expansion and formed by depositing on the tube a ring of an alkali metal salt such as a lithium salt, which ring is subsequently fired. Such a tube containing blood may then be broken to extract blood more easily for use in other tests, for example a test for haemoglobin estimation by adding a drop of blood to a copper sulphate solution, or to obtain a tube of a specific length filled with blood for use in a centrifugal packed cell volume test.

I claim:

1. A method of internally coating a capillary tube with powdered material, said tube having poor electrical conductivity, comprising the steps of supplying a charge of the powdered material to one end of the tube, said charge being in a substantially dry condition and of a mesh size such that the material can flow freely through the tube, positioning the tube at an angle relative to the horizontal with said one end uppermost so that particles of the powdered material flow into the tube, and subjecting the tube to rapid vibrational movement so as to cause rubbing contact between said particles and the internal wall of the tube, whereby said rubbing contact induces an electrostatic charge in the tube and the particles adhere to the internal wall of the tube by electrostatic attraction.

2. A method as claimed in claim 1, wherein the capillary tube is rotated about an axis parallel to its longitudinal axis while the tube is subjected to said vibrational movement.

3. A method as claimed in claim 1, including the step of inducing an additional electrostatic charge in a member supporting said capillary tube, whereby part of said additional electrostatic charge is transmitted by conduction into said capillary tube.

4. A method as claimed in claim 1, wherein the additional electrostatic charge is induced in said member by rubbing static-electricity-inducing material against said member.

5. A method as claimed in claim 1, wherein the powdered material is passed through the capillary tube successively in opposite directions until a uniform coating of the powered material is formed on the internal wall of the capillary tube throughout its length.

6. A method of internally coating a plurality of capillary tubes with powdered material, comprising the steps of placing a charge of the powdered material in a portion of a tubular container, said charge being in a substantially dry condition and of a mesh size such that the material can flow freely through the tubes, loosely packing the capillary tubes into an adjacent portion of the container with the axes of the capillary tubes substantially parallel to the axis of the tubular container, positioning the container at an angle to the horizontal with the powder above the capillary tubes, and subjecting the container and tubes to rapid vibrational movement, whereby an electrostatic charge is induced in the tubes and part of the powdered material passes through the interior of the tubes and adheres to the internal walls thereof by electrostatic attraction.

7. A method as claimed in claim 6, including the steps of inducing in the container and capillary tubes an electrostatic charge additional to that induced by the vibrational movement of the container and tubes.

8. A method as claimed in claim 7, wherein the additional electrostatic charge is induced in the container and capillary tubes by rubbing animal fur against the container.

9. A method as claimed in claim 6, wherein the tubular container is rotated about its longitudinal axis while it is subjected to the vibrational movement.

10. A method as claimed in claim 9, wherein a band of the fur is mounted around the periphery of a rotating pulley, the band of fur being lapped or knotted to form an enlargement arranged to strike the container once in each revolution of the pulley and thereby impart an impact blow to the container and cause the container to move about its longitudinal axis.

References Cited

UNITED STATES PATENTS

| | | | |
|---|---|---|---|
| 2,438,561 | 3/1948 | Kearsley | 117—18 X |
| 2,538,562 | 1/1951 | Gustin et al. | 117—17 |

(Other references on following page)

UNITED STATES PATENTS

| | | | |
|---|---|---|---|
| 3,074,808 | 1/1963 | Harrison | 117—18 X |
| 3,142,579 | 7/1964 | Brooks | 117—21 |
| 3,186,860 | 6/1965 | Jones | 117—17 |
| 3,218,184 | 11/1965 | Lemelson | 117—21 |
| 3,248,253 | 4/1966 | Barford et al. | 117—17 |
| 3,291,693 | 12/1966 | Brown | 167—84.5 |

OTHER REFERENCES

Miller, Seward E.: "A Textbook of Clinical Pathology," 6th edition, Williams & Wilkins Co., 1960, pp. 43–46.

Becton, Dickinson and Company: "A Quick Reference Guide to Vacutainer Specimen Tubes for Blood Tests." VRS, September 1961, 2 pages.

WILLIAM D. MARTIN, *Primary Examiner.*

EDWARD J. CABIC, *Assistant Examiner.*

U.S. Cl. X.R.

117—18; 118—622; 167—84.5; 23—230; 128—2, 214; 252—408; 73—61.4